Patented Jan. 3, 1950

2,493,288

UNITED STATES PATENT OFFICE 2,493,288

SYNERGISTIC ANTIOXIDANTS AND THE
METHODS OF PREPARING THE SAME

Lloyd A. Hall, Chicago, Ill., assignor to The Griffith Laboratories, Inc., a corporation of Illinois No Drawing. Application May 2, 1947,
Serial No. 745,647

13 Claims. (Cl. 260—398.5)

1

This invention relates to an antioxidant and more particularly to a phospholipoid carrier for a gallic acid ester antioxidant.

This application is a continuation-in-part of my copending application Serial No. 606,283, filed July 20, 1945, now Patent No. 2,464,928.

It is an object of this invention to provide an improved synergistic antioxidant material for preserving and stabilizing such food substances as lard, oleo oil, chicken fat, turkey fat, butter, peanut butter, salad dressings, mayonnaise, cheese spreads, vegetable oils, fish oils, hydrogenated fats, vitamins A and D, chocolate, cocoa, cocoa butter, coconut fats, essential oils, margarine, and other fatty food products, or food products containing large amounts of fatty matter which are subjected to rancidity development.

It has been known that propyl gallate and other low alkyl esters of gallic acid such as methyl gallate, ethyl gallate, and butyl gallate, have good antioxidant properties. These materials, however, are difficult to introduce to fatty compositions. Prior to the copending application of myself and Leon Gershbein, Serial No. 598,900, filed June 11, 1945, now Patent No. 2,464,927, the practice had been to dissolve the ester in a volatile solvent, distribute the solvent through the food composition, and then evaporate it. The solvents used were not palatable in food products so that vacuum removal thereof had to be employed and the resulting introduction of the material was expensive and not wholly satisfactory. In large batches of lard, for instance, it has been impossible to get good solubility of propyl gallate, when added alone, and thus the stability protection desired. As with other antioxidants, the addition of propyl gallate alone has required filtration of the treated fatty food to eliminate traces of insoluble antioxidant matter. In other instances, it has been necessary to dissolve antioxidants in solvents such as alcohols or ethers, and then to blow off the solvent. This added step of deodorization is expensive, particularly with products like lard, which is not a large-profit item; and further, only the largest fat, oil and food processing factories are presently equipped for deodorization. In the copending application referred to, Serial No. 598,900, an oil carrier for the propyl gallate or similar material is disclosed.

The use of an oil is quite satisfactory for most purposes, but it does have a tendency to lower the melting point of material such as lard, and the amount of oil which may be employed is, therefore, limited.

It has also been known that lecithin has some

2 antioxidant properties, and the material is well known as an emulsifier. It does, however, in many cases have the effect of greatly reducing the viscosity of materials to which it is added, as, for example, in the well known case of chocolate compositions.

I have discovered that there is a progressive solubility of propyl gallate in a vegetable oil carrier containing tocopherols such as corn oil. This solubility is a function of temperature and the amount of lecithin that is used. Where the antioxidant, such as propyl gallate, is used in large amounts of lecithin, these large amounts induce foaming and frothing when the fats or oils are heated, and when moisture-containing materials such as raw potato chips or noodles are added to such heated fats and oils. When the vegetable oil, lecithin, and propyl gallate are used together, the synergistic antioxidant properties are increased by the amount of lecithin used in that the lecithin exerts its wetting action by carrying the solubilized propyl gallate into the interstices of the food prepared. Tests were made wherein up to 4% propyl gallate and 0 to 8.5% lecithin were dissolved in vegetable oil by heating at temperatures ranging from 166° F. to 206° F. 100 g. samples were prepared by heating the required amounts of corn oil and lecithin. 4 g. of propyl gallate were then added with moderate stirring. The mixture was allowed to stand for at least one day for attainment of equilibrium and centrifuged for 15 minutes at 1200 R. P. M. in order to remove undissolved propyl gallate. Samples were then taken and analyzed for the amounts of propyl gallate in solution. The method used for analysis was essentially that described by Mattil and Filer, "Determination of Gallic Acid Added to Fats and Oils," Ind. Eng. Chem., Anal., Ed., vol. 16, page 427, 1944. The experimental data obtained was as follows:

Percent solubility of propyl gallate in solutions of corn oil containing various percentages of lecithin

| Per Cent Lecithin | 166° F. | 176° F. | 186° F. | 196° F. | 206° F. |
|---|---|---|---|---|---|
| | Per Cent | Per Cent | Per Cent | Per Cent | Per Cent |
| 0 | 1.16 | 1.21 | 1.18 | | 1.40 |
| 0.5 | | | 2.57 | 2.80 | 3.69 |
| 1.0 | 2.16 | | | | 3.74 |
| 2.0 | 2.53 | 2.69 | 2.96 | 3.29 | 4.00 |
| 3.0 | 2.80 | | 3.36 | 3.76 | 4.00 |
| 4.0 | 2.93 | 3.52 | 3.52 | 4.00 | 4.00 |
| 5.0 | 3.12 | 3.86 | 4.00 | 4.00 | 4.00 |
| 6.0 | 3.35 | 4.00 | 4.00 | 4.00 | 4.00 |
| 7.0 | | 4.00 | 4.00 | 4.00 | 4.00 |
| 8.5 | 4.00 | 4.00 | 4.00 | 4.00 | 4.00 |

This table shows that to obtain a solution containing 4% propyl gallate dissolved therein, the following minimum quantities of lecithin are needed when the mixtures were heated to the specified temperatures:

| Water Bath Temperature | Temperature of Solution | Minimum Per Cent Lecithin Required for Solubilizing 4.00% of Propyl Gallate |
|---|---|---|
| °F. | °F. | Per Cent |
| 170 | 166 | 7.75 |
| 180 | 176 | 5.50 |
| 190 | 186 | 4.50 |
| 200 | 196 | 3.25 |
| 210 | 206 | 1.25 |

As indicated by this experimental data, corn oil dissolves a small amount of propyl gallate at various workable temperatures. The addition of lecithin to corn oil in a very minor proportion assists in solubilizing propyl gallate up to a desired amount. This desired amount is here shown as 4% propyl gallate. 2% of lecithin and 94% of corn oil will hold in solution 4% propyl gallate at 206° F. The table shows, however, that even as small as 1.25% lecithin will also solubilize 4% propyl gallate at this temperature. 8.5% lecithin will hold 4% of propyl gallate in solution at room temperature.

It appears essential that the oil used be one that contains tocopherols. Corn oil was used in the above tests as it is an ideal oil for this purpose. The tests show that where heat is used very small amounts of lecithin may be employed in solubilizing desired amounts of propyl gallate in the oil. It was formerly believed that relatively large amounts of lecithin were needed to solubilize the propyl gallate. The antioxidant that is used is a low alkyl ester of gallic acid. This may be either methyl gallate, ethyl gallate, propyl gallate, or butyl gallate. Instead of lecithin any phospholipoid may used.

The foregoing detailed description has been given for clearness of understanding only, and no unnecessary limitations should be understood therefrom.

I claim:

1. The method of incorporating a low alkyl ester of gallic acid in a fatty material in an amount greater than that which is normally soluble in said fatty material, which comprises dissolving said ester in a molten phospholipoid, then introducing the molten solution to the fatty composition likewise in molten form, and thoroughly admixing the materials.

2. The method as set forth in claim 1, in which the phospholipoid is lecithin and the antioxidant is propyl gallate.

3. The method of solubilizing a normally fat-insoluble low alkyl ester of gallic acid in a fatty material which comprises adding to the fatty material a phospholipoid, heating to a temperature of at least 166° F., and adding more than about 1.40% by weight of the ester.

4. The method of claim 3 wherein the phospholipoid is lecithin and the ester is propyl gallate.

5. The method of solubilizing a low alkyl ester of gallic acid in a fatty material containing tocopherols, said ester being introduced into the fatty material in an amount greater than that which is normally soluble in said fatty material, which comprises adding to the fatty material from 8.5 to 1.25% by weight of a phospholipoid, heating to a temperature of 166° F. to 206° F., and adding up to 4.0% of the ester.

6. The method of claim 5 wherein the phospholipoid is lecithin and the ester is propyl gallate.

7. A synergistic antioxidant composition comprising from 8.5 to 1.25% by weight of a phospholipoid, up to 4.0% of a low alkyl ester of gallic acid, and a fatty material, said ester being present in an amount greater than that which is normally soluble in said fatty material.

8. The composition of claim 7 wherein the phospholipoid is lecithin and the ester is propyl gallate.

9. The composition of claim 7 wherein the fatty material contains tocopherols.

10. The method of incorporating a low alkyl ester of gallic acid in a fatty material which comprises associating the ester and the fatty material with a phospholipoid at an elevated temperature, said ester being present in an amount greater than that which is normally soluble in said fatty material, and the amount of said phospholipoid being approximately the minimum amount required for dissolving the desired amount of ester at the temperature employed.

11. The method as set forth in claim 10 in which the phospholipoid is lecithin and the ester is propyl gallate.

12. A synergistic antioxidant composition comprising more than about 1.25% by weight of the composition of a phospholipoid, more than about 1.4% by weight of the composition of a low alkyl ester of gallic acid, and a fatty material containing tocopherols, said ester being dissolved in said fatty material in an amount greater than that which is normally soluble in said fatty material alone.

13. The composition of claim 12 wherein said phosopholipoid is lecithin and said ester is propyl gallate.

LLOYD A. HALL.

REFERENCES CITED

The following references are of record in the file of this patent:

UNITED STATES PATENTS

| Number | Name | Date |
|---|---|---|
| 1,831,728 | Working | Nov. 10, 1931 |
| 2,051,257 | Holmes | Aug. 18, 1936 |
| 2,150,732 | Thurman | Mar. 14, 1939 |
| 2,255,191 | Sabalitschka et al. | Sept. 9, 1941 |